(12) United States Patent
Lee et al.

(10) Patent No.: US 11,558,171 B2
(45) Date of Patent: Jan. 17, 2023

(54) APPARATUS AND METHOD FOR ENCRYPTION, APPARATUS AND METHOD FOR CONVERTING CIPHERTEXT

(71) Applicants: SAMSUNG SDS CO., LTD., Seoul (KR); Korea Advanced Institute of Science and Technology, Daejeon (KR)

(72) Inventors: Joo Hee Lee, Seoul (KR); Duk Jae Moon, Seoul (KR); Hyo Jin Yoon, Seoul (KR); Ji Hoon Cho, Seoul (KR); Eun Kyung Kim, Seoul (KR); Seong Kwang Kim, Daejeon (KR); Joo Young Lee, Daejeon (KR); Jin Cheol Ha, Daejeon (KR); Won Seok Choi, Daejeon (KR)

(73) Assignees: SAMSUNG SDS CO., LTD., Seoul (KR); Korea Advanced Institute of Science and Technology, Daejeon (KR)

( * ) Notice: Subject to any disclaimer, the term of this patent is extended or adjusted under 35 U.S.C. 154(b) by 213 days.

(21) Appl. No.: 17/081,862

(22) Filed: Oct. 27, 2020

(65) Prior Publication Data
US 2021/0328765 A1 Oct. 21, 2021

(30) Foreign Application Priority Data

Apr. 20, 2020 (KR) .................. 10-2020-0047585
Oct. 21, 2020 (KR) .................. 10-2020-0137067

(51) Int. Cl.
*H04L 9/00* (2022.01)
(52) U.S. Cl.
CPC .................. *H04L 9/008* (2013.01)
(58) Field of Classification Search
CPC .................................................. H04L 9/008
See application file for complete search history.

(56) References Cited

U.S. PATENT DOCUMENTS

2017/0134157 A1* 5/2017 Laine .................. G09C 1/00
2019/0363871 A1* 11/2019 Cheon .................. H04L 9/008
(Continued)

FOREIGN PATENT DOCUMENTS

WO WO-2021129714 A1 * 7/2021

OTHER PUBLICATIONS

Efficient Integer Encoding for Homomorphic Encryption via Ring Isomorphisms, Technische Universitat Darmstadt, Darmstadt, Germany, @Springer International Publishing Switerland 2015 (Year: 2015).*

(Continued)

*Primary Examiner* — Meng Li
(74) *Attorney, Agent, or Firm* — The PL Law Group, PLLC

(57) ABSTRACT

A method for encryption according to an embodiment includes generating a ciphertext for a secret key that is an integer vector by using an integer-based first homomorphic encryption algorithm, generating a key stream that is the integer vector from a nonce and the secret key by using a key stream generator, encoding the key stream by using a message encoding function of the first homomorphic encryption algorithm, encoding a message that is a real vector by using a message encoding function of a real number-based second homomorphic encryption algorithm, generating a ciphertext for the message by using a result of the encoding of the key stream and a result of the encoding of the message, and transmitting the nonce, the ciphertext for the secret key, and the ciphertext for the message to an apparatus for converting a ciphertext.

24 Claims, 5 Drawing Sheets

(56) References Cited

U.S. PATENT DOCUMENTS

2020/0151356 A1* 5/2020 Rohloff .............. G06F 21/6227
2020/0228307 A1* 7/2020 Cheon .................. H04L 9/3093

OTHER PUBLICATIONS

Cheon, Jung Hee, et al. "A full RNS variant of approximate homomorphic encryption." International Conference on Selected Areas in Cryptography, Springer, Cham, 2018, pp. 1-21, See the entire document.

Fan, Junfeng et al., "Somewhat Practical Fully Homomorphic Encryption.", IACR Cryptology ePrint Archive 2012 (2012):144, pp. 1-19, See the entire document.

* cited by examiner

APPARATUS AND METHOD FOR ENCRYPTION, APPARATUS AND METHOD FOR CONVERTING CIPHERTEXT

CROSS REFERENCE TO RELATED APPLICATIONS AND CLAIM OF PRIORITY

This application claims the benefit of Korean Patent Application Nos. 10-2020-0047585 filed on Apr. 20, 2020 and 10-2020-0137067 filed on Oct. 21, 2020 in the Korean Intellectual Property Office, the disclosure of which is incorporated herein by reference in its entirety.

BACKGROUND

Technical Field

Embodiments disclosed herein relate to a homomorphic encryption technique.

Background Art of the Invention

Homomorphic encryption is an encryption system that enables the analysis of encrypted data without decryption. Currently, the biggest problem when using homomorphic encryption is that the size of the encrypted data is very large, and thus the network transmission cost and server storage cost are high.

On the other hand, symmetric key encryption enables safe and efficient data transmission/storage since the sizes of the message and the ciphertext are the same, but it has the disadvantage that the encrypted data is not able to be analyzed without decryption.

Meanwhile, studies on converting a ciphertext for symmetric key encryption into a ciphertext for homomorphic encryption have been conducted, but the studies have been limited to homomorphic encryption that supports the operations for integers, and thus they are not able to be applied to homomorphic encryption that supports the operations for real numbers. However, in many cases, when analyzing actual data, the input value is a real value, and even if an integer type is used as an input value, most of the values have real values due to the operation processing during the analysis process. That is, in order to perform machine learning, deep learning, and the like on the actual encrypted data, the operations for real numbers are essential. However, when an encryption analysis of data of real numbers is required, there was no efficient method for converting a ciphertext encrypted with the symmetric key encryption into a ciphertext for the homomorphic encryption that supports the operations for real numbers.

SUMMARY

Embodiments disclosed herein are to provide an apparatus and method for encryption, and an apparatus and a method for converting a ciphertext.

A method for encryption according to an embodiment includes generating a ciphertext for a secret key that is an integer vector by using an integer-based first homomorphic encryption algorithm, generating a key stream that is the integer vector from a nonce and the secret key by using a key stream generator, encoding the key stream by using a message encoding function of the first homomorphic encryption algorithm, encoding a message that is a real vector by using a message encoding function of a real number-based second homomorphic encryption algorithm, generating a ciphertext for the message by using a result of the encoding of the key stream and a result of the encoding of the message, and transmitting the nonce, the ciphertext for the secret key, and the ciphertext for the message to an apparatus for converting a ciphertext.

The first homomorphic encryption algorithm may be a homomorphic encryption algorithm that supports modulo operations with a prime number t as a modulus.

A message space of the first homomorphic encryption algorithm may be a vector space over a finite field with the prime number t as a modulus, and the nonce, the secret key, the key stream, and the ciphertext for the message may be elements of the vector space.

The key stream generator may include a generation function for generating a random vector of a preset length based on the nonce and a counter, and r (where, r≥1) round functions sequentially applied to the secret key based on the random sequence.

A message space of the second homomorphic encryption algorithm may be a real space or a complex space, and the message may be an element of the real space or the complex space.

The generating of the ciphertext may include generating the ciphertext for the message by performing a modulo addition on the result of the encoding of the key stream and the result of the encoding of the message with a prime number t as a modulo.

A method for converting a ciphertext according to an embodiment includes receiving, from an apparatus for encryption, a nonce, a ciphertext for a secret key that is an integer vector, generating a ciphertext for a key stream used by the apparatus for encryption to generate the ciphertext for the message, based on the nonce and the ciphertext for the secret key, and converting the ciphertext for the message by using the ciphertext for the key stream and the ciphertext for the message, in which the ciphertext for the secret key is a ciphertext encrypted by using an integer-based first homomorphic encryption algorithm, the ciphertext for the message is a ciphertext encrypted by using a result of encoding he key stream using a message encoding function of the first homomorphic encryption algorithm and a result of encoding the message using a message encoding function of a real number-based second homomorphic encryption algorithm, the key stream is the integer vector generated from the nonce and the secret key by using a key stream generator, the generating of the ciphertext for the key stream includes generating the ciphertext for the keystream using a homomorphic operation based on the first homomorphic encryption algorithm for the key stream generator, and the converting includes converting the ciphertext for the message into a ciphertext based on the second homomorphic encryption algorithm.

The first homomorphic encryption algorithm may be a homomorphic encryption algorithm that supports modulo operations with a prime number t as a modulus.

A message space of the first homomorphic encryption algorithm may be a vector space over a finite field with the prime number t as a modulus, and the nonce, the secret key, the key stream, and the ciphertext for the message may be elements of the vector space.

The key stream generator may include a generation function for generating a random vector of a preset length based on the nonce and a counter, and r (where, r≥1) round functions sequentially applied to the secret key based on the random sequence.

A message space of the second homomorphic encryption algorithm may be a real space or a complex space, and the message may be an element of the real space or the complex space.

The ciphertext for the message may be a ciphertext generated by performing a modulo addition on a result of encoding the key stream and a result of encoding the message with the prime number t as a modulo, and the converting may include converting the ciphertext for the message into a ciphertext based on the second homomorphic encryption algorithm by performing a modulo subtraction on the ciphertext for the key stream and the ciphertext for the message with an integer q set in the second homomorphic encryption algorithm as a modulo.

An apparatus for encryption includes a memory that stores one or more instructions and one or more processors that execute the one or more instructions, in which the one or more processors perform operations including generating a ciphertext for a secret key that is an integer vector by using an integer-based first homomorphic encryption algorithm, generating a key stream that is the integer vector from a nonce and the secret key by using a key stream generator, encoding the key stream by using a message encoding function of the first homomorphic encryption algorithm, encoding a message that is a real vector by using a message encoding function of a real number-based second homomorphic encryption algorithm, generating a ciphertext for the message by using a result of the encoding of the key stream and a result of the encoding of the message, and transmitting the nonce, the ciphertext for the secret key, and the ciphertext for the message to an apparatus for converting a ciphertext.

The first homomorphic encryption algorithm may be a homomorphic encryption algorithm that supports modulo operations with a prime number t as a modulus.

A message space of the first homomorphic encryption algorithm may be a vector space over a finite field with the prime number t as a modulus, and the nonce, the secret key, the key stream, and the ciphertext for the message may be elements of the vector space.

The key stream generator may include a generation function for generating a random vector of a preset length based on the nonce and a counter, and r (where, r≥1) round functions sequentially applied to the secret key based on the random sequence.

A message space of the second homomorphic encryption algorithm may be a real space or a complex space, and the message may be an element of the real space or the complex space.

The generating of the ciphertext may include generating the ciphertext for the message by performing a modulo addition on the result of the encoding of the key stream and the result of the encoding of the message with a prime number t as a modulo.

An apparatus for converting a ciphertext according to an embodiment includes a memory that stores one or more instructions and one or more processors that execute the one or more instructions, in which the one or more processors perform operations including receiving, from an apparatus for encryption, a nonce, a ciphertext for a secret key that is an integer vector, and a ciphertext for a message that is a real vector, generating a ciphertext for a key stream used by the apparatus for encryption to generate the ciphertext for the message, based on the nonce and the ciphertext for the secret key, and converting the ciphertext for the message by using the ciphertext for the key stream and the ciphertext for the message, the ciphertext for the secret key is a ciphertext encrypted by using an integer-based first homomorphic encryption algorithm, the ciphertext for the message is a ciphertext encrypted by using a result of encoding the key stream using a message encoding function of the first homomorphic encryption algorithm and a result of encoding the message using a message encoding function of a real number-based second homomorphic encryption algorithm, the key stream is the integer vector generated from the nonce and the secret key by using a key stream generator, the generating of the ciphertext for the key stream includes generating the ciphertext for the keystream using a homomorphic operation based on the first homomorphic encryption algorithm for the key stream generator, and the converting includes converting the ciphertext for the message into a ciphertext based on the second homomorphic encryption algorithm.

The first homomorphic encryption algorithm may be a homomorphic encryption algorithm that supports modulo operations with a prime number t as a modulus.

A message space of the first homomorphic encryption algorithm may be a vector space over a finite field with the prime number t as a modulus, and the nonce, the secret key, the key stream, and the ciphertext for the message may be elements of the vector space.

The key stream generator may include a generation function for generating a random vector of a preset length based on the nonce and a counter, and r (where, r≥1) round functions sequentially applied to the secret key based on the random sequence.

A message space of the second homomorphic encryption algorithm may be a real space or a complex space, and the message may be an element of the real space or the complex space.

The ciphertext for the message may be a ciphertext generated by performing a modulo addition on a result of encoding the key stream and a result of encoding the message with the prime number t as a modulo, and the converting may include converting the ciphertext for the message into a ciphertext based on the second homomorphic encryption algorithm by performing a modulo subtraction on the ciphertext for the key stream and the ciphertext for the message with an integer q set in the second homomorphic encryption algorithm as a modulo.

According to the disclosed embodiments, by encrypting data of real number using symmetric key encryption, and when analysis of the data is required, converting the data into a ciphertext encrypted with homomorphic encryption that supports operations for real numbers, it is possible to analyze data of real-numbers in an encrypted state, and to significantly reduce the amount of ciphertext storage and the amount of network transmission.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only for illustrative purpose and the present invention is not limited thereto.

In describing the embodiments of the present invention, when it is determined that detailed descriptions of known technology related to the present invention may unnecessarily obscure the gist of the present invention, the detailed descriptions thereof will be omitted. The terms used below are defined in consideration of functions in the present invention, but may be changed depending on the customary practice or the intention of a user or operator. Thus, the definitions should be determined based on the overall content of the present specification. The terms used herein are only for describing the embodiments of the present invention, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
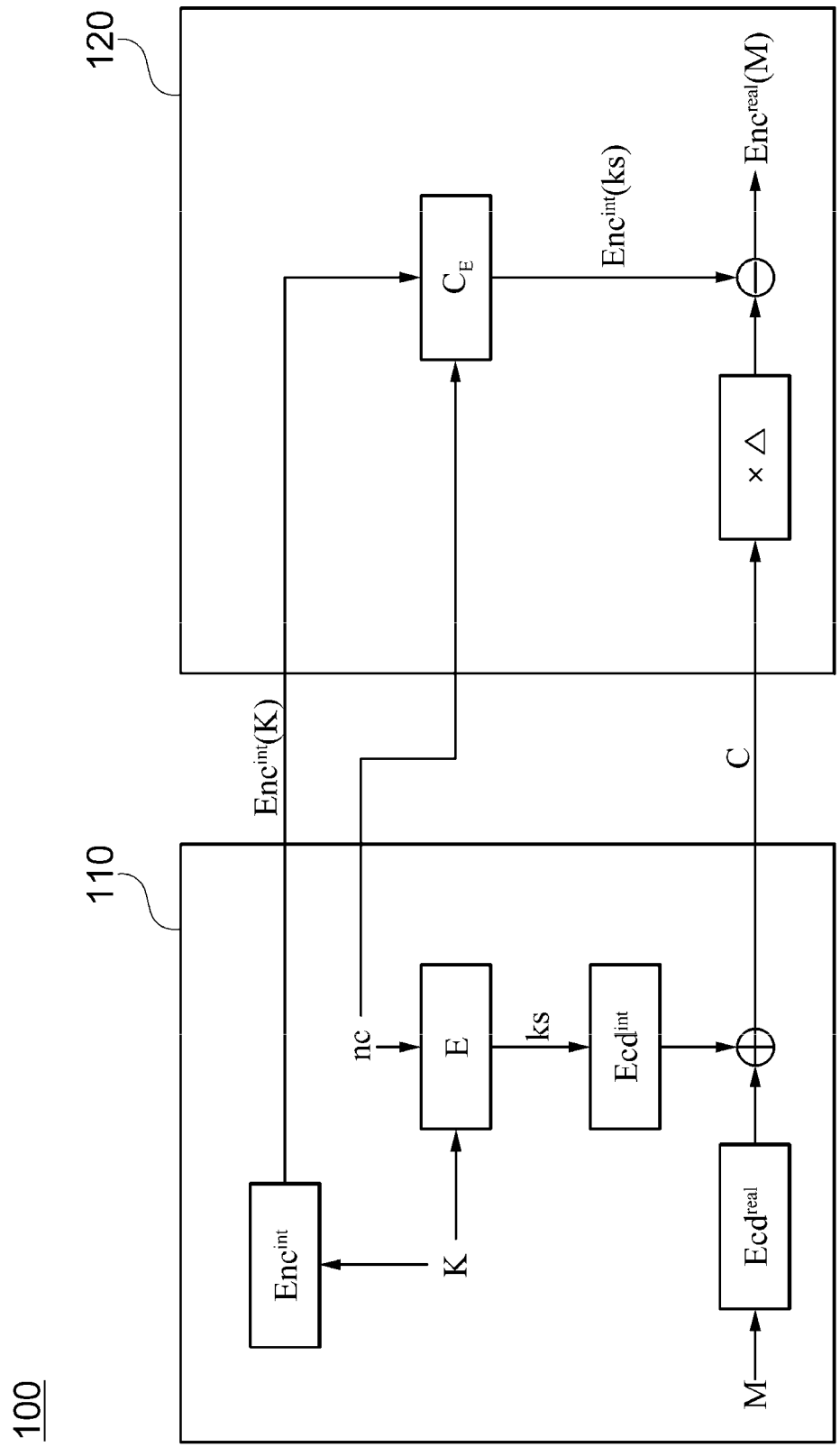
FIG. 1 a diagram for illustrating an operation of an encryption system according to an embodiment.

FIG. 1 is a diagram for illustrating an operation of an encryption system according to an embodiment.

Referring to FIG. 1, an encryption system 100 according to an embodiment includes an apparatus 110 for encryption (encryption apparatus) and an apparatus 120 for converting a ciphertext (ciphertext conversion apparatus).

The encryption apparatus 110 is a device for generating a ciphertext for a message that is a real vector and providing it to the ciphertext conversion apparatus 120.

Specifically, the encryption apparatus 110 generates a ciphertext $Enc^{int}(K)$ for a secret key K, which is an integer vector, by using a first homomorphic encryption algorithm, which is an integer-based homomorphic encryption algorithm.

In this case, the homomorphic encryption algorithm refers to encryption technology that enables encrypted data to be calculated in an encrypted state. In addition, in the following, the homomorphic operation based on the homomorphic encryption algorithm for a specific operation or a specific function refers to the operation for using the data encrypted using the homomorphic encryption algorithm in an encrypted state to generate a ciphertext for a result of applying the specific operation or the specific function to a plaintext data of the encrypted data.

As a specific example, the homomorphic operation ⊞ for addition may refer to an operation for generating a ciphertext $Enc(x_1+x_2)$ for the result of addition of $x_1$ and $x_2$ by using a ciphertext $Enc(x_1)$ obtained by encrypting plaintext data $x_1$ and the ciphertext $Enc(x_2)$ obtained by encrypting plaintext data $x_2$ in an encrypted state, for example, as shown in Equation 1 below.

$$Enc(x_1) \boxplus Enc(x_2) \rightarrow Enc(x_1+x_2) \qquad \text{[Equation 1]}$$

In addition, the homomorphic operation ⊡ for multiplication may refer to an operation for generating a ciphertext $Enc(x_1 \cdot x_2)$ for the result of multiplication of $x_1$ and $x_2$ by using a ciphertext $Enc(x_1)$ obtained by encrypting plaintext data $x_1$ and the ciphertext $Enc(x_2)$ obtained by encrypting plaintext data $x_2$ in an encrypted state to for example, as shown in Equation 2 below.

$$Enc(x_1) \boxdot Enc(x_2) \rightarrow Enc(x_1 \cdot x_2) \qquad \text{[Equation 2]}$$

Also, the homomorphic operation $\boxed{f}$ for a specific function f may refer to an operation for generating a ciphertext $Enc(f(x))$ for the result of applying the function f to the plaintext data x by using a ciphertext $Enc(x)$ obtained by encrypting plaintext data x in an encrypted state, for example, as shown in Equation 3 below.

$$\boxed{f} Enc(x)) \rightarrow Enc(f(x)) \qquad \text{[Equation 3]}$$

Meanwhile, the integer-based homomorphic encryption algorithm refers to a homomorphic encryption algorithm that supports encryption and homomorphic operations on data of integers. Specifically, according to an embodiment, the integer-based homomorphic encryption algorithm may be a homomorphic encryption algorithm that supports modulo operations with a prime number t as a modulus.

For example, the first homomorphic encryption algorithm may be a homomorphic encryption algorithm based on the Brakerski/Fan-Vercauteren scheme (B/FV scheme) (hereinafter, BFV homomorphic encryption algorithm); however, the first homomorphic encryption algorithm is not necessarily limited to a specific homogeneous cryptographic algorithm as long as it is an integer-based homomorphic encryption algorithm.

Meanwhile, a message space of the first homomorphic encryption algorithm is a vector space $\mathbb{Z}_t^n$ (where, n is the order of the vector space and is a natural number with n≥1) over a finite field with a prime number t as a modulus, and the secret key K may be an element of $\mathbb{Z}_t^n$ (that is, $K \in \mathbb{Z}_t^n$).

Meanwhile, the encryption apparatus 110 generates a key stream, which is an integer vector, from a nonce nc and the secret key K using a key stream generator E.

In this case, the nonce is an element of the vector space $\mathbb{Z}_t^n$, and may be a randomly generated value.

Specifically, the key stream generator E may be implemented by using various functions capable of randomly generating the key stream, which is an element of the vector space $\mathbb{Z}_t^n$, by using the nonce nc and the secret key K, which are elements of the vector space $\mathbb{C}_t^n$, as input values.

Figure 2:
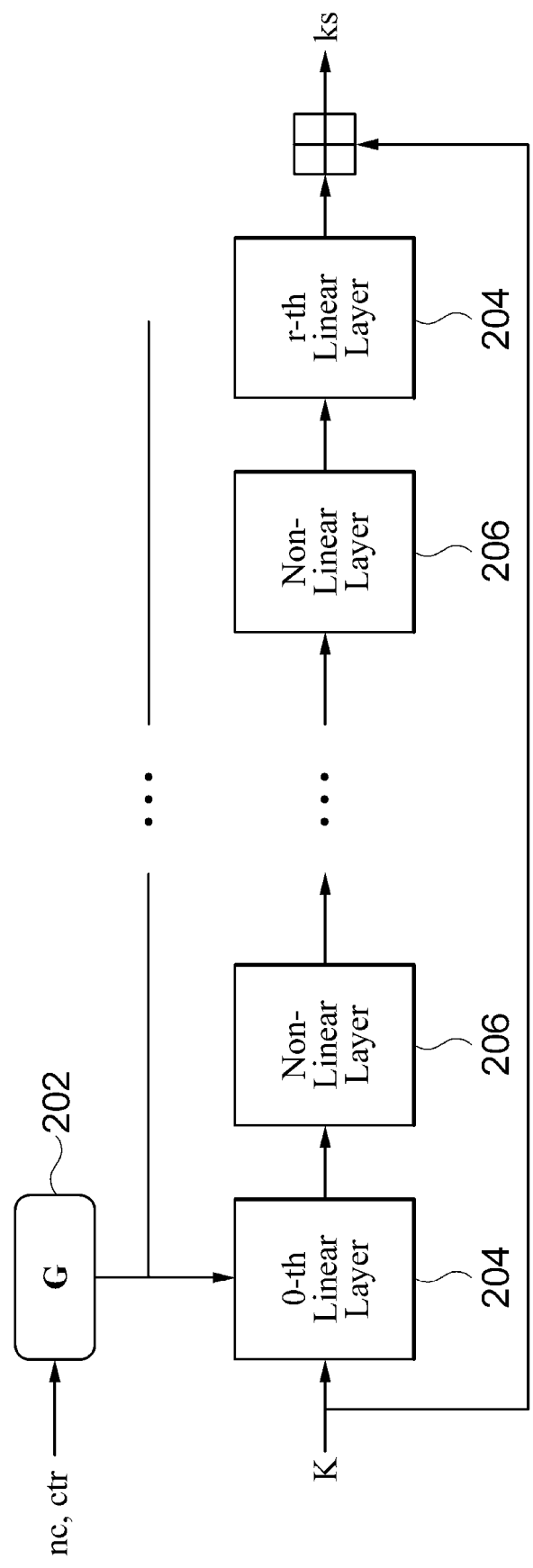
FIG. 2 is a diagram illustrating an example of generating a key stream using a key stream generator according to an embodiment.

Specifically, FIG. 2 is a diagram illustrating an example of generating a key stream using a key stream generator according to an embodiment.

Referring to FIG. 2, the key stream generator E according to an embodiment may include a generation function 202 for generating a random vector of a preset length based on the nonce nc and a counter ctr, and r round functions (where, r is a natural number of r≥1) each including a linear layer 204 and a non-linear layer 206.

Specifically, the generation function 202 of the key stream generator E may receive the nonce nc and the counter ctr and generate r vectors that are each random vectors of k*n dimensions (where, k is a natural number with k≥1). In this case, the counter ctr may be a preset value that starts from 0 and increases by one each time the key stream for the secret key is generated by using the key stream generator E. In addition, the generation function 202 may be, for example, an international standard hash function, such as a SHA3-based SHAKE-256 function; however, is not necessarily limited to a specific function.

Meanwhile, the key stream generator E may use r vectors generated by the generation function 202 to generate each r random matrices $M_1, \ldots, M_r \in \mathbb{C}_t^{n \times n}$ of size n×n and r n-dimensional vectors $b_1, \ldots, b_r \in \mathbb{C}_t^n$.

In this case, the i-th matrix $M_i$ (1≤i≤r) among r matrices may be generated by using, for example, an n-dimensional vector including the first value to the n-th value among k*n values included in an i-th vector among r k*n-dimensional vectors generated by the generation function 202 and a preset irreducible polynomial.

As a specific example, when the n-dimensional vector including the first value to the n-th value of the i-th vector among the r vectors generated by the generation function 202 is $a_i = (a_1, \ldots, a_n)$, the matrix Mi may be built by $a_i$ and the generation source α of $\mathbb{C}_t^n$, as in Equation 4 below.

$$M = \begin{bmatrix} a_1 & \alpha \cdot a_n & \alpha \cdot a_{n-1} & \ldots & \alpha \cdot a_3 & \alpha \cdot a_2 \\ a_2 & a_1 & \alpha \cdot a_n & \ldots & \alpha \cdot a_4 & \alpha \cdot a_3 \\ \vdots & \vdots & \vdots & \vdots & \vdots & \vdots \\ a_{n-1} & a_{n-2} & a_{n-3} & \ldots & a_1 & \alpha \cdot a_n \\ a_n & a_{n-1} & a_{n-2} & \ldots & a_2 & a_1 \end{bmatrix}$$ [Equation 4]

Meanwhile, the i-th vector $b_i$ of the r n-dimensional vectors may include, for example, the k*n−n+1-th value to the k*n-th value among k*n values included in the i-th vector among the r k*n dimensional vectors generated by the generation function 202.

Then, the key stream generator E may sequentially apply r round functions to the secret key K. In this case, the i-th round function of the r round functions may include the linear layer 204 and the non-linear layer 206.

In this case, the linear layer 204 of the i-th round function may be defined as in Equation 5 below.

$$L_i(x) = M_i \cdot x_i + b_i (\text{mod } t) \in \mathbb{Z}_t^n$$ [Equation 5]

Here, $x_i$ represents an input vector for the linear layer 204 of the i-th round function.

Meanwhile, the non-linear layer 206 of the i-th round function may be configured to generate an output vector by applying a preset non-linear function to an input vector input to the non-linear layer 206.

Specifically, when the output vector of the linear layer 204 of the i-th round function is $L_i(x) = (y_1, \ldots, y_n)$, the non-linear function may be, for example, a χ function defined as in Equation 6 below.

$$\chi(L_i(x))_j = y_{j+2} + y_{j+1} \cdot y_{j+2} (\text{mod } t)$$ [Equation 6]

Here, j may be cyclically selected with mod n.

Meanwhile, the non-linear function used in the non-linear layer 206 is not necessarily limited to the χ function described above, and in addition to the χ function, various non-linear functions may be used capable of generating an output vector that is an element of $\mathbb{Z}_t^n$ for the input vector that is an element of $\mathbb{Z}_t^n$.

Meanwhile, the key stream generator E may generate a key stream ks through modulo addition of the results generated by sequentially applying r round functions to the secret key K and the secret key K, as in Equation 7 below.

$$ks = K + \text{Round}_r \circ \ldots \circ \text{Round}_1(K)(\text{mod } t) \in \mathbb{Z}_t^n$$ [Equation 7]

Meanwhile, the key stream generator E used by the encryption apparatus 110 is not necessarily limited to the example illustrated in FIG. 2, and in addition to the example illustrated in FIG. 2, may be implemented using various functions capable of generating any vector that is an element of the vector space $\mathbb{Z}_t^n$ from the nonce nc and the secret key K that are each elements of the vector space $\mathbb{Z}_t^n$.

Referring back to FIG. 1, the encryption apparatus 110 encodes the key stream ks by using a message encoding function $\text{Ecd}^{int}$ of the first homomorphic encryption algorithm.

In this case, the message encoding function refers to a function used to encode multiple data to be encrypted into one polynomial (or a vector corresponding to the polynomial) in order to enable a single instruction, multiple data (SIMD) operation.

For example, when the first homomorphic encryption algorithm is the B/FV homomorphic encryption algorithm, the encryption apparatus 110 may encode the key stream ks (that is, $ks \in \mathbb{Z}_t^n$) that is an n-dimensional integer vector by using a message encoding function as in Equation 8 below.

$$\text{Ecd}^{int}(ks) = (V_n^{BFV})^{-1} \cdot ks \in \mathbb{Z}_t^n$$ t[Equation 8]

Here, $V_n^{BFV}$ represents an n×n matrix (that is, $V_n^{BFV} \in \mathbb{Z}_t^{n \times n}$) having an inverse matrix.

Meanwhile, the message encoding function of the first homomorphic encryption algorithm may be modified depending on the type of the first homomorphic encryption algorithm, and is not necessarily limited to a specific function.

Meanwhile, the encryption apparatus 110 encodes a message M that is a real vector by using a message encoding function of a second homogeneous encryption algorithm, which is a real number-based homomorphic encryption algorithm.

In this case, the real number-based homomorphic encryption algorithm refers to a homomorphic encryption algorithm that supports encryption and homomorphic operations on data of real numbers.

For example, the second homomorphic encryption algorithm may be a homomorphic encryption algorithm based on the Cheon, Kim, Kim, and Song scheme (CKKS scheme) (hereinafter, CKKS homomorphic encryption algorithm); however, the first homomorphic encryption algorithm is not necessarily limited to a specific homogeneous cryptographic algorithm as long as it is a real number-based homomorphic encryption algorithm.

Meanwhile, a message space of the second homomorphic encryption algorithm may be a real space $\mathbb{R}^{n/2}$ or complex space $\mathbb{C}^{n/2}$, and the message M may be an element of the message space of the second homomorphic encryption algorithm (that is, $M \in \mathbb{R}^{n/2}$ or $M \in \mathbb{C}^{n/2}$).

Meanwhile, when the second homomorphic encryption algorithm is the CKKS homomorphic encryption algorithm, the encryption apparatus 110 may encode the message M by using a message encoding function as in Equation 9 below.

$$\text{Ecd}^{real}(M) = [\delta \cdot \tau^{-1}(M)] \in \mathbb{Z}^n$$ [Equation 9]

Here, the message M is a real vector of $M \in \mathbb{C}^{n/2}$, δ is a real scaling factor (δ>0), and [·] is a rounding function rounding off to the nearest integer. In addition, when $\varsigma = \exp(-\pi i/n)$, τ represents canonical embedding in which $\tau: \mathbb{Q}[X]/(X^n + 1) \to \mathbb{C}^{n/2}$ is defined as $p(X) \mapsto (P(\varsigma), P(\varsigma^5), \ldots, P(\varsigma^{2n-3}))$.

Meanwhile, the message encoding function of the second homomorphic encryption algorithm may be modified depending on the type of the second homomorphic encryption algorithm, and is not necessarily limited to a specific function.

Meanwhile, the encryption apparatus 110 generates a ciphertext C for the message M by using an encoding result $\text{Ecd}^{int}(ks)$ for the key stream ks and an encoding result $\text{Ecd}^{real}(M)$ for the message M.

In this case, according to an embodiment, the encryption apparatus 110 may generate the ciphertext C by performing modulo addition with a prime number t as a module t as in Equation 10 below.

$$C = Ecd^{int}(ks) + Ecd^{real}(M)(\mod t) \in \mathbb{Z}_t^n \qquad \text{[Equation 10]}$$

Then, the encryption apparatus 110 transmits the nonce nc, the ciphertext $Enc^{int}(K)$ for the secret key K, and the ciphertext C for the message M to the ciphertext conversion apparatus 120.

The ciphertext conversion apparatus 120 converts the ciphertext C received from the encryption apparatus 110 into a ciphertext based on the second homomorphic encryption algorithm. In this case, the converting of the ciphertext C into a ciphertext based on the second homomorphic encryption algorithm may refer to the converting of the ciphertext ℂ into the same ciphertext as the ciphertext generated by encrypting the message M using the second homomorphic encryption algorithm.

Specifically, the ciphertext conversion apparatus 120 generates a ciphertext $Enc^{int}(ks)$ based on the first homomorphic encryption algorithm for the key stream ks by performing the homomorphic operation based on the first homomorphic encryption algorithm for the key stream generator E using the ciphertext $Enc^{int}(K)$ and the nonce nc received from the apparatus encryption 110. In this case, the ciphertext $Enc^{int}(ks)$ based on the first homomorphic encryption algorithm for the key stream ks refer to the same ciphertext as the ciphertext generated by encrypting the key stream ks using the first homomorphic encryption algorithm.

For example, when the key stream generation process by the key stream generator E is the same as the example illustrated in FIG. 2, the ciphertext conversion apparatus 120 may generate the ciphertext $Enc^{int}(ks)$ from the ciphertext $Enc^{int}(K)$ and the nonce nc by performing the homomorphic operation based on the first homomorphic encryption algorithm corresponding to each of the generation function 203, and the linear layer 204 and the non-linear layer 206 constituting each round function.

On the other hand, when the ciphertext $Enc^{int}(ks)$ is generated, the ciphertext conversion apparatus 120 converts the ciphertext ℂ into a ciphertext $Enc^{real}(M)$ based on the second homomorphic encryption algorithm by using the generated ciphertext $Enc^{int}(ks)$ and the ciphertext ℂ for the message M received from the encryption apparatus 110.

Specifically, the ciphertext conversion apparatus 120 may convert the ciphertext ℂ into the ciphertext $Enc^{real}(M)$ based on the second homomorphic encryption algorithm, for example, by using Equation 11 below.

$$Enc^{real}(M) = \Delta \times C - Enc^{int}(ks)(\mod q) \qquad \text{[Equation 11]}$$

Here, q represents an integer of q≥2 as a modulus set for encryption using the second homomorphic encryption algorithm, and Δ represents a positive real number with Δ=[q/t].

Figure 3:
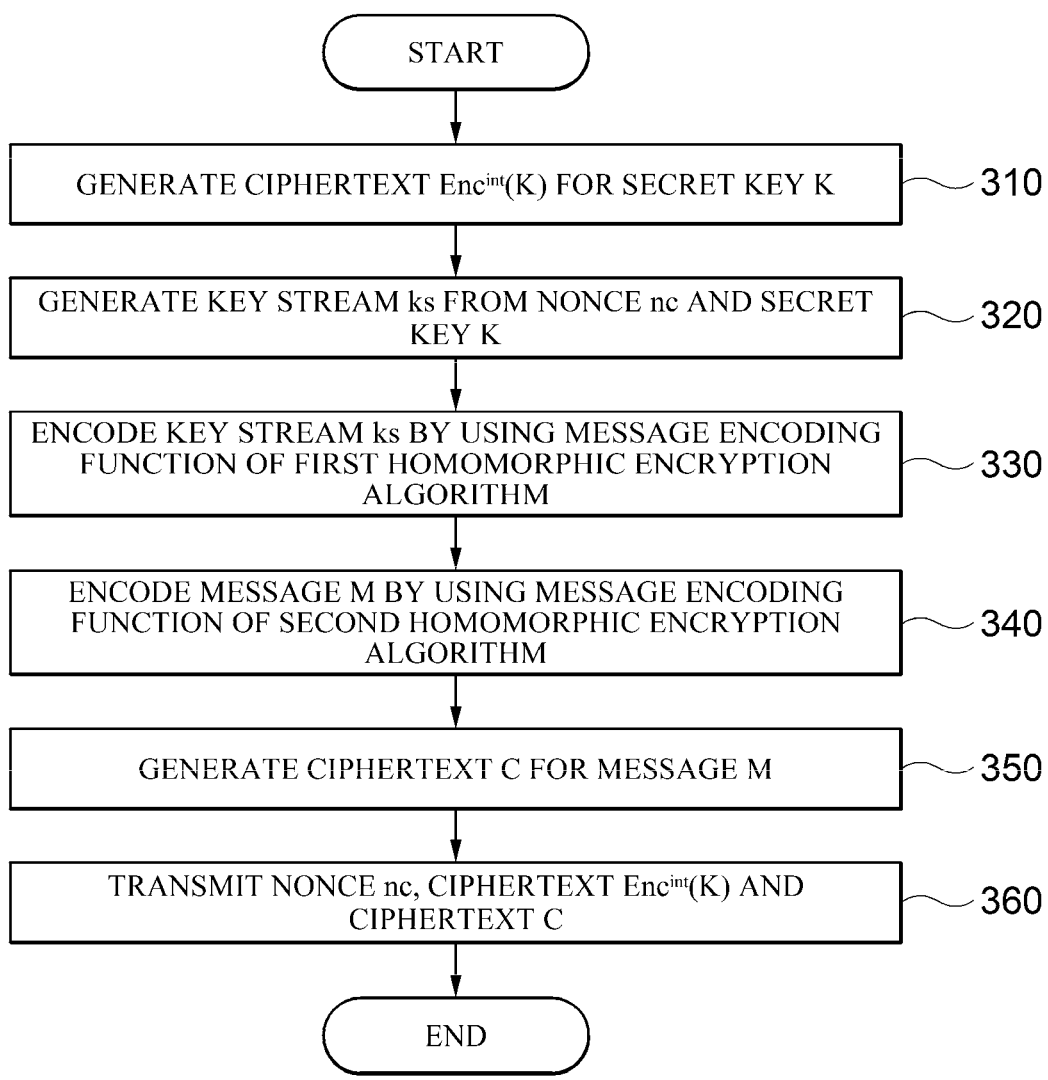
FIG. 3 is a flowchart of a method for encryption according to an embodiment.

FIG. 3 is a flowchart of a method for encryption according to an embodiment.

The method illustrated in FIG. 3 may be performed, for example, by the encryption apparatus 110 illustrated in FIG. 1.

Referring to FIG. 3, first, the encryption apparatus 110 generates a ciphertext $Enc^{int}(K)$ for a secret key K, which is an integer vector, by using the integer-based first homomorphic encryption algorithm (310).

Then, the encryption apparatus 110 generates the key stream ks, which is an integer vector, from the nonce nc and the secret key K using the key stream generator (320).

Then, the encryption apparatus 110 encodes the key stream ks by using the message encoding function $Ecd^{int}$ of the first homomorphic encryption algorithm (330).

Then, the encryption apparatus 110 encodes the message M by using the message encoding function $Ecd^{real}$ of the real number-based second homomorphic encryption algorithm (340).

Then, the encryption apparatus 110 generates the ciphertext C for the message M by using the encoding result $Ecd^{int}(ks)$ for the key stream ks and the encoding result $Ecd^{real}(M)$ for the message M (350).

Then, the encryption apparatus 110 transmits the nonce nc, the ciphertext $Enc^{int}(K)$ for the secret key K, and the ciphertext C for the message M to the ciphertext conversion apparatus 120 (360).

Meanwhile, in the flowchart illustrated in FIG. 3, at least some of the steps may be performed in a different order, performed together in combination with other steps, omitted, performed in subdivided steps, or performed by adding one or more steps not illustrated.

Figure 4:
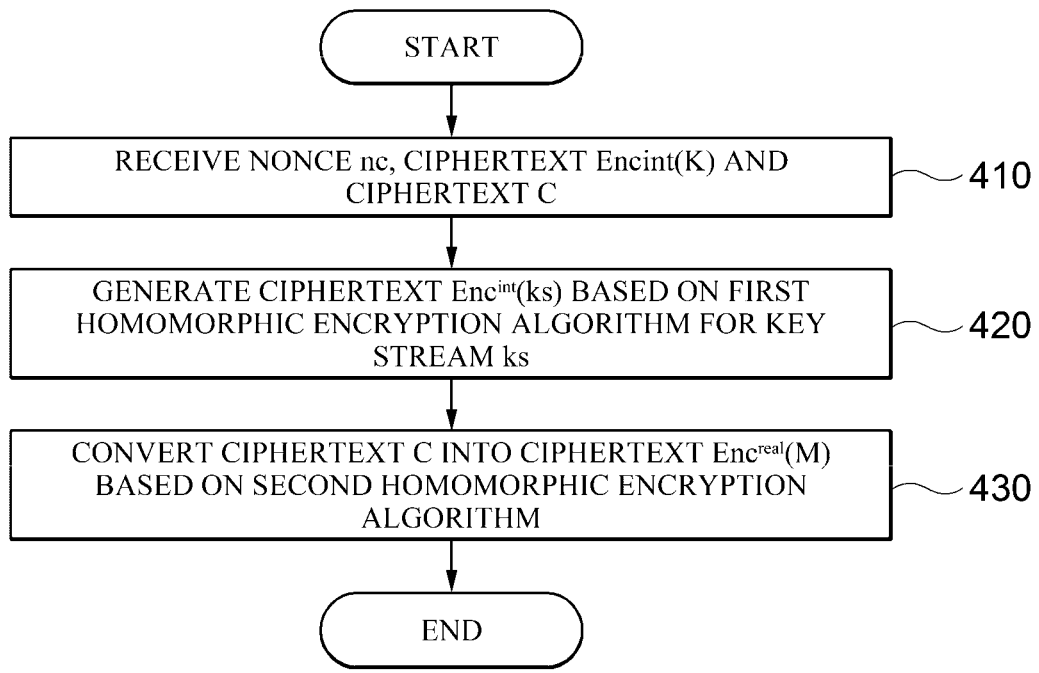
FIG. 4 is a flowchart of a method for converting a ciphertext according to an embodiment.

FIG. 4 is a flowchart of a method for converting a ciphertext according to an embodiment.

The method illustrated in FIG. 4 may be performed, for example, by the ciphertext conversion apparatus 120 illustrated in FIG. 1.

Then, the ciphertext conversion apparatus 120 receives the nonce nc, the ciphertext $Enc^{int}(K)$ for the secret key K, and the ciphertext C for the message M from the encryption apparatus 110 (410).

Then, the ciphertext conversion apparatus 120 generates a ciphertext $Enc^{int}(ks)$ based on the first homomorphic encryption algorithm for the key stream ks by performing the homomorphic operation based on the first homomorphic encryption algorithm for the key stream generator E using the ciphertext $Enc^{int}(K)$ and the nonce nc received from the encryption apparatus 110 (420).

Then, the ciphertext conversion apparatus 120 converts the ciphertext C into a ciphertext $Enc^{real}(M)$ based on the second homomorphic encryption algorithm by using the generated ciphertext $Enc^{int}(ks)$ and the ciphertext C for the message M received from the encryption apparatus 110 (430).

Meanwhile, in the flowchart illustrated in FIG. 4, at least some of the steps may be performed in a different order, performed together in combination with other steps, omitted, performed in subdivided steps, or performed by adding one or more steps not illustrated.

Figure 5:
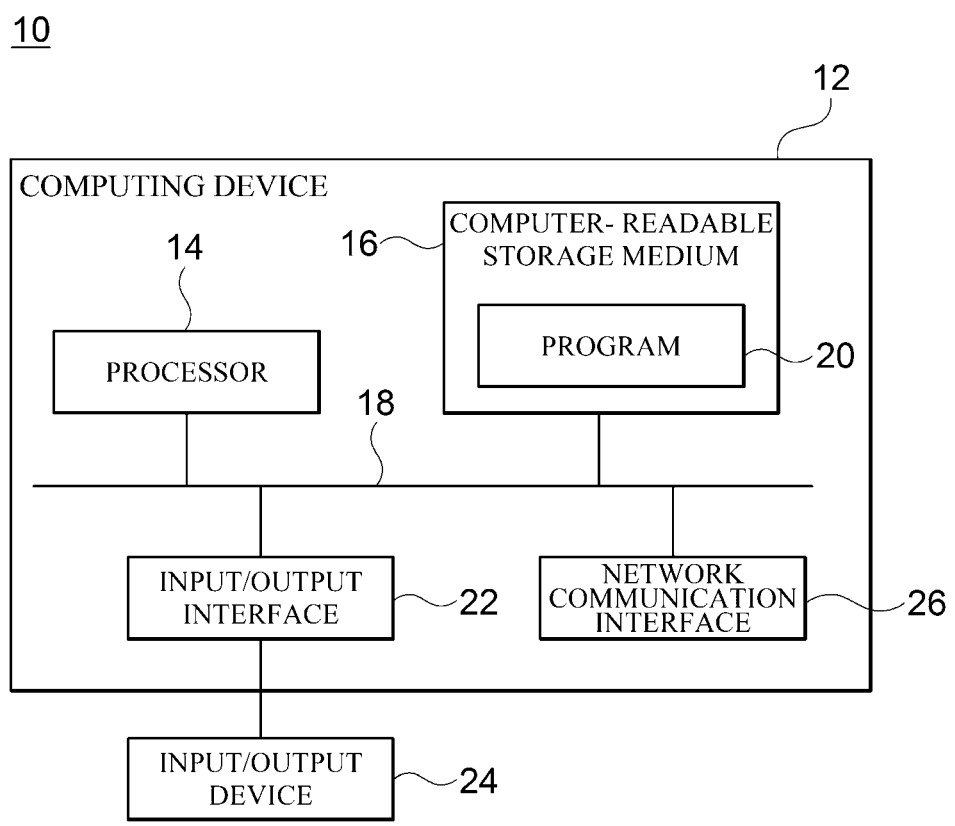
FIG. 5 is a block diagram for exemplarily illustrating a computing environment including a computing device according to an embodiment.

FIG. 5 is a block diagram for exemplarily illustrating a computing environment including a computing device according to an embodiment. In the illustrated embodiment, each component may have different functions and capabilities in addition to those described below, and additional components may be included in addition to those described below.

The illustrated computing environment 110 includes a computing device 12. In an embodiment, the computing device 12 may be one or more components included in the encryption apparatus 110 or the ciphertext conversion apparatus 120 illustrated in FIG. 1.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the present invention has been described in detail through the representative embodiments as above, those skilled in the art will understand that various modifications may be made thereto without departing from the scope of the present invention. Therefore, the scope of rights of the present invention should not be limited to the described embodiments, but should be defined not only by the claims set forth below but also by equivalents of the claims.

What is claimed is:

1. A method for encryption, the method comprising:
   generating a first ciphertext for a secret key that is an integer vector by using an integer-based first homomorphic encryption algorithm;
   generating a key stream that is an integer vector from a nonce and the secret key by using a key stream generator;
   encoding the key stream by using a message encoding function of the first homomorphic encryption algorithm;
   encoding a message that is a real vector by using a message encoding function of a real number-based second homomorphic encryption algorithm;
   generating a second ciphertext for the message by using a result of the encoding of the key stream and a result of the encoding of the message; and
   transmitting the nonce, the first ciphertext for the secret key, and the second ciphertext for the message to an apparatus for converting a ciphertext.

2. The method for encryption of claim 1, wherein the first homomorphic encryption algorithm is a homomorphic encryption algorithm that supports modulo operations with a prime number t as a modulus.

3. The method for encryption of claim 2, wherein a message space of the first homomorphic encryption algorithm is a vector space over a finite field with the prime number t as a modulus, and
   the nonce, the secret key, the key stream, and the second ciphertext for the message are elements of the vector space.

4. The method for encryption of claim 1, wherein the key stream generator includes a generation function for generating a random vector of a preset length based on the nonce and a counter, and r (where, r≥1) round functions sequentially applied to the secret key based on the random sequence.

5. The method for encryption of claim 1, wherein a message space of the second homomorphic encryption algorithm is a real space or a complex space, and
   the message is an element of the real space or the complex space.

6. The method for encryption of claim 1, wherein the generating of the ciphertext includes generating the second ciphertext for the message by performing a modulo addition on the result of the encoding of the key stream and the result of the encoding of the message with the prime number t as a modulo.

7. A method for converting a ciphertext, the method comprising:
   receiving, from an apparatus for encryption, a nonce, a first ciphertext for a secret key that is an integer vector, and a second ciphertext for a message that is a real vector;
   generating a third ciphertext for a key stream used by the apparatus for encryption to generate the second ciphertext for the message, based on the nonce and the first ciphertext for the secret key; and
   converting the second ciphertext for the message by using the third ciphertext for the key stream and the second ciphertext for the message,
   wherein the first ciphertext for the secret key is a ciphertext encrypted by using an integer-based first homomorphic encryption algorithm,
   the second ciphertext for the message is a ciphertext encrypted by using a result of encoding the key stream using a message encoding function of the first homomorphic encryption algorithm and a result of encoding the message using a message encoding function of a real number-based second homomorphic encryption algorithm,
   the key stream is an integer vector generated from the nonce and the secret key by using a key stream generator,
   the generating of the third ciphertext for the key stream includes generating the third ciphertext for the key-stream using a homomorphic operation based on the first homomorphic encryption algorithm for the key stream generator, and
   the converting includes converting the second ciphertext for the message into a ciphertext based on the second homomorphic encryption algorithm.

8. The method for converting a ciphertext of claim 7, wherein the first homomorphic encryption algorithm is a homomorphic encryption algorithm that supports modulo operations with a prime number t as a modulus.

9. The method for converting a ciphertext of claim 8, wherein a message space of the first homomorphic encryption algorithm is a vector space over a finite field with the prime number t as a modulus, and
the nonce, the secret key, the key stream, and the second ciphertext for the message are elements of the vector space.

10. The method for converting a ciphertext of claim 7, wherein the key stream generator includes a generation function for generating a random vector of a preset length based on the nonce and a counter, and r (where, r≥1) round functions sequentially applied to the secret key based on the random sequence.

11. The method for converting a ciphertext of claim 7, wherein a message space of the second homomorphic encryption algorithm is a real space or a complex space, and
the message is an element of the real space or the complex space.

12. The method for converting a ciphertext of claim 7, wherein the second ciphertext for the message is a ciphertext generated by performing a modulo addition on a result of encoding the key stream and a result of encoding the message with the prime number t as a modulo, and
the converting includes converting the second ciphertext for the message into a ciphertext based on the second homomorphic encryption algorithm by performing a modulo subtraction on the third ciphertext for the key stream and the second ciphertext for the message with an integer q set in the second homomorphic encryption algorithm as a modulo.

13. An apparatus for encryption, the apparatus comprising:
a memory that stores one or more instructions; and
one or more processors that execute the one or more instructions,
wherein the one or more processors perform operations comprising:
generating a first ciphertext for a secret key that is an integer vector by using an integer-based first homomorphic encryption algorithm;
generating a key stream that is an integer vector from a nonce and the secret key by using a key stream generator;
encoding the key stream by using a message encoding function of the first homomorphic encryption algorithm;
encoding a message that is a real vector by using a message encoding function of a real number-based second homomorphic encryption algorithm;
generating a second ciphertext for the message by using a result of the encoding of the key stream and a result of the encoding of the message; and
transmitting the nonce, the first ciphertext for the secret key, and the second ciphertext for the message to an apparatus for converting a ciphertext.

14. The apparatus for encryption of claim 13, wherein the first homomorphic encryption algorithm is a homomorphic encryption algorithm that supports modulo operations with a prime number t as a modulus.

15. The apparatus for encryption of claim 14, wherein a message space of the first homomorphic encryption algorithm is a vector space over a finite field with the prime number t as a modulus, and
the nonce, the secret key, the key stream, and the second ciphertext for the message are elements of the vector space.

16. The apparatus for encryption of claim 13, wherein the key stream generator includes a generation function for generating a random vector of a preset length based on the nonce and a counter, and r (where, r≥1) round functions sequentially applied to the secret key based on the random sequence.

17. The apparatus for encryption of claim 13, wherein a message space of the second homomorphic encryption algorithm is a real space or a complex space, and
the message is an element of the real space or the complex space.

18. The apparatus for encryption of claim 13, wherein the generating of the ciphertext includes generating the second ciphertext for the message by performing a modulo addition on the result of the encoding of the key stream and the result of the encoding of the message with the prime number t as a modulo.

19. An apparatus for converting a ciphertext, the apparatus comprising:
a memory that stores one or more instructions; and
one or more processors that execute the one or more instructions,
wherein the one or more processors perform operations comprising:
receiving, from an apparatus for encryption, a nonce, a first ciphertext for a secret key that is an integer vector, and a second ciphertext for a message that is a real vector;
generating a third ciphertext for a key stream used by the apparatus for encryption to generate the second ciphertext for the message, based on the nonce and the first ciphertext for the secret key; and
converting the second ciphertext for the message by using the third ciphertext for the key stream and the second ciphertext for the message;
the first ciphertext for the secret key is a ciphertext encrypted by using an integer-based first homomorphic encryption algorithm;
the second ciphertext for the message is a ciphertext encrypted by using a result of encoding the key stream using a message encoding function of the first homomorphic encryption algorithm and a result of encoding the message using a message encoding function of a real number-based second homomorphic encryption algorithm;
the key stream is an integer vector generated from the nonce and the secret key by using a key stream generator;
the generating of the third ciphertext for the key stream includes generating the third ciphertext for the keystream using a homomorphic operation based on the first homomorphic encryption algorithm for the key stream generator; and
the converting includes converting the second ciphertext for the message into a ciphertext based on the second homomorphic encryption algorithm.

20. The apparatus for converting a ciphertext of claim 19, wherein the first homomorphic encryption algorithm is a homomorphic encryption algorithm that supports modulo operations with a prime number t as a modulus.

21. The apparatus for converting a ciphertext of claim 20, wherein a message space of the first homomorphic encryption algorithm is a vector space over a finite field with the prime number t as a modulus, and
the nonce, the secret key, the key stream, and the second ciphertext for the message are elements of the vector space.

22. The apparatus for converting a ciphertext of claim 19, wherein the key stream generator includes a generation function for generating a random vector of a preset length based on the nonce and a counter, and r (where, r≥1) round functions sequentially applied to the secret key based on the random sequence.

23. The apparatus for converting a ciphertext of claim 19, wherein a message space of the second homomorphic encryption algorithm is a real space or a complex space, and
   the message is an element of the real space or the complex space.

24. The apparatus for converting a ciphertext of claim 19, wherein the second ciphertext for the message is a ciphertext generated by performing a modulo addition on a result of encoding the key stream and a result of encoding the message with the prime number t as a modulo, and
   the converting includes converting the second ciphertext for the message into a ciphertext based on the second homomorphic encryption algorithm by performing a modulo subtraction on the third ciphertext for the key stream and the second ciphertext for the message with an integer q set in the second homomorphic encryption algorithm as a modulo.

\* \* \* \* \*